(12) United States Patent
Goel et al.

(10) Patent No.: US 12,332,761 B1
(45) Date of Patent: Jun. 17, 2025

(54) METRIC MANAGEMENT IN MULTI-COMPUTING CLUSTER ENVIRONMENT

(71) Applicant: International Business Machines Corporation, Armonk, NY (US)

(72) Inventors: Seep Goel, Bengaluru (IN); Kavya Govindarajan, Chennai (IN); Chander Govindarajan, Chennai (IN); Priyanka Prakash Naik, Mumbai (IN); Praveen Jayachandran, Bangalore (IN); Aishwariya Chakraborty, Bankura (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/582,114

(22) Filed: Feb. 20, 2024

(51) Int. Cl.
*G06F 11/34* (2006.01)
*H04L 67/10* (2022.01)

(52) U.S. Cl.
CPC .......... *G06F 11/3409* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,755,925 B2 * | 9/2017 | Poola | H04L 67/10 |
| 10,467,036 B2 | 11/2019 | Anwar et al. | |
| 10,678,602 B2 | 6/2020 | Manglik et al. | |
| 11,671,312 B2 * | 6/2023 | Puri | H04L 43/04 |
| | | | 709/224 |
| 2016/0080226 A1 * | 3/2016 | Poola | H04L 43/08 |
| | | | 709/224 |
| 2016/0105335 A1 * | 4/2016 | Choudhary | H04L 41/5032 |
| | | | 709/224 |
| 2017/0351715 A1 | 12/2017 | Cudak et al. | |
| 2018/0241649 A1 * | 8/2018 | Mazzitelli | H04L 43/024 |
| 2019/0196929 A1 | 6/2019 | Megahed et al. | |

OTHER PUBLICATIONS

M. A. Aleisa et al., "Examining the Performance of Fog-Aided, Cloud-Centered IoT in a Real-World Environment," Sensors, Oct. 20, 2021, 32 pages, vol. 21, No. 6950.

(Continued)

*Primary Examiner* — Quang N Nguyen
(74) *Attorney, Agent, or Firm* — Caleb Wilkes; Ryan, Mason & Lewis, LLP

(57) ABSTRACT

Metric management techniques in a multi-cluster computing environment are disclosed. For example, a method obtains a set of metrics collected from one or more computing clusters of a distributed computing environment, wherein the set of metrics are associated with one or more processes that are executable on the one or more computing clusters. The method computes one or more metric importance values for the set of metrics based on one or more processing criteria. The method sends the one or more metric importance values to at least one computing cluster of the one or more computing clusters to enable the at least one computing cluster to adapt a collection frequency of at least one metric of the set of metrics. Such adaptation, by way of example, can be based on the metric importance and resource availability.

20 Claims, 8 Drawing Sheets

(56) References Cited

OTHER PUBLICATIONS

W. Wang et al., "Closed-Loop Network Performance Monitoring and Diagnosis with SpiderMon," 19th USENIX Symposium on Networked Systems Design and Implementation, Apr. 2022, pp. 267-285.
T. Yang et al., "Elastic Sketch: Adaptive and Fast Network-wide Measurements," Proceedings of the 2018 Conference of the ACM Special Interest Group on Data Communication, Aug. 2018, pp. 561-575.
N. Yaseen et al., "Towards a Cost vs. Quality Sweet Spot for Monitoring Networks," arXiv:2110.05554v1, Oct. 11, 2021, 9 pages.
W. Zhao et al., "Scheduling Sensor Data Collection with Dynamic Traffic Patterns," IEEE Transactions on Parallel and Distributed Systems, May 29, 2012, 14 pages.

\* cited by examiner

Run at cloud manager whenever app KPIs or importance changes.

Input: app_kpi[][] (time series for each KPI of each app),
app_importance[] (constant for each app determined by SME),
c(i,k,m): correlation of metric[] (time series of metrics) with app_kpi[][] (computed offline/centrally)

Output: metric_importance[][] (x*y matrix where x represents all apps and y represents all metrics)

Iterate over all apps: iterator i
  Iterate over KPIs: iterator k
    Iterate over all metrics: iterator m (can be pruned to iterate over a subset of pertinent metrics for each app)
      c(i,k,m) = correlation of metric[m] with app_kpi[i][k]
      if |c(i,k,m)| > threshold
        then metric_importance[i][m] = app_importance[i] * (|c(i,k,m)| – threshold)

FIG. 5

Executed periodically at each cluster

Input: resource_availability[], (time series of percentage resource availability for each resource required for monitoring e.g. cpu, memory, bandwidth, etc. – collected by Cluster Resource Monitor)
default_budget, max_budget, min_budget, (these are determined by SME – default budget can be same as monitoring budget in existing systems without adaptive metrics collection system)
default_resource_availability[] (this can be provided by SME or determined based on historical data)

Output: cluster_budget initialized to default_budget resource_availability_change[] = resource_availability[] - default_resource_availability[])
budget_change = c * (min(resource_availability_change[]))

if min_budget <= default_budget + budget_change <= max_budget:
    cluster_budget = default_budget + budget_change

FIG. 6

Executed periodically at each cluster
Input: metric_importance[][], cluster_budget, metric_cost[], reward function r(.)
Output: metric_freq[]

cluster_metric_importance[] = sum_x(metric_importance[x][]), for all x in set{applications deployed on the cluster}

Optimize (maximize) reward r(.) = Sum_i ( cluster_metric_importance[i] * log (metric_freq[i] *a + b))

Subject to
    Sum_i (metric_freq[i] * metric_cost[i]) <= cluster_budget metric_freq[i] * cluster_metric_importance[i] >= min_threshold (to ensure that any metric with non-zero importance is not ignored)

Convert metric_freq[] to integer values by rounding down

FIG. 7

METRIC MANAGEMENT IN MULTI-COMPUTING CLUSTER ENVIRONMENT

BACKGROUND

The present application relates to distributed computing environments such as multi-computing cluster environments and, more specifically, to techniques for managing metrics in such multi-computing cluster environments. The landscape of distributed computing environments evolves and extends beyond centralized clouds to implement multi-cloud and edge deployments.

SUMMARY

Illustrative embodiments provide metric management techniques for distributed computing environments.

In one illustrative embodiment, a computer-implemented method includes obtaining a set of metrics collected from one or more computing clusters of a distributed computing environment, wherein the set of metrics are associated with one or more processes that are executable on the one or more computing clusters. The computer-implemented method further includes computing one or more metric importance values for the set of metrics based on one or more processing criteria. The computer-implemented method further includes sending the one or more metric importance values to at least one computing cluster of the one or more computing clusters to enable the at least one computing cluster to adapt a collection frequency of at least one metric of the set of metrics.

In another illustrative embodiment, an apparatus includes a processing platform including one or more processing devices, wherein each of the one or more processing devices includes a processor coupled to a memory, and wherein at least one processing device of the one or more processing devices, when executing program code, is configured to obtain a set of metrics collected from one or more computing clusters of a distributed computing environment, wherein the set of metrics are associated with one or more processes that are executable on the one or more computing clusters. The at least one processing device, when executing program code, is further configured to compute one or more metric importance values for the set of metrics based on one or more processing criteria. The at least one processing device, when executing program code, is further configured to send the one or more metric importance values to at least one computing cluster of the one or more computing clusters to enable the at least one computing cluster to adapt a collection frequency of at least one metric of the set of metrics.

In another illustrative embodiment, a computer-implemented method includes obtaining one or more metric importance values for a set of metrics, wherein the set of metrics are associated with one or more processes that are executable on one or more computing clusters of a distributed computing environment. The computer-implemented method further includes adapting a collection frequency of at least one metric of the set of metrics, wherein the adapted collection frequency of the at least one metric of the set of metrics is based on at least the one or more metric importance values for the set of metrics. Adaptation can also, for example, be based on resource availability.

These and other objects, features and advantages of the present disclosure will become apparent from the following detailed description of illustrative embodiments thereof, which is to be read in connection with the accompanying drawings.

BRIEF DESCRIPTION OF THE DRAWINGS

FIG. 5 illustrates an example of pseudocode for computing one or more metric importance values according to an illustrative embodiment.

FIG. 6 illustrates an example of pseudocode for computing a resource allocation for a computing cluster according to an illustrative embodiment.

FIG. 7 illustrates an example of pseudocode for computing a metric collection frequency for a computing cluster according to an illustrative embodiment.

DETAILED DESCRIPTION

Figure 1:
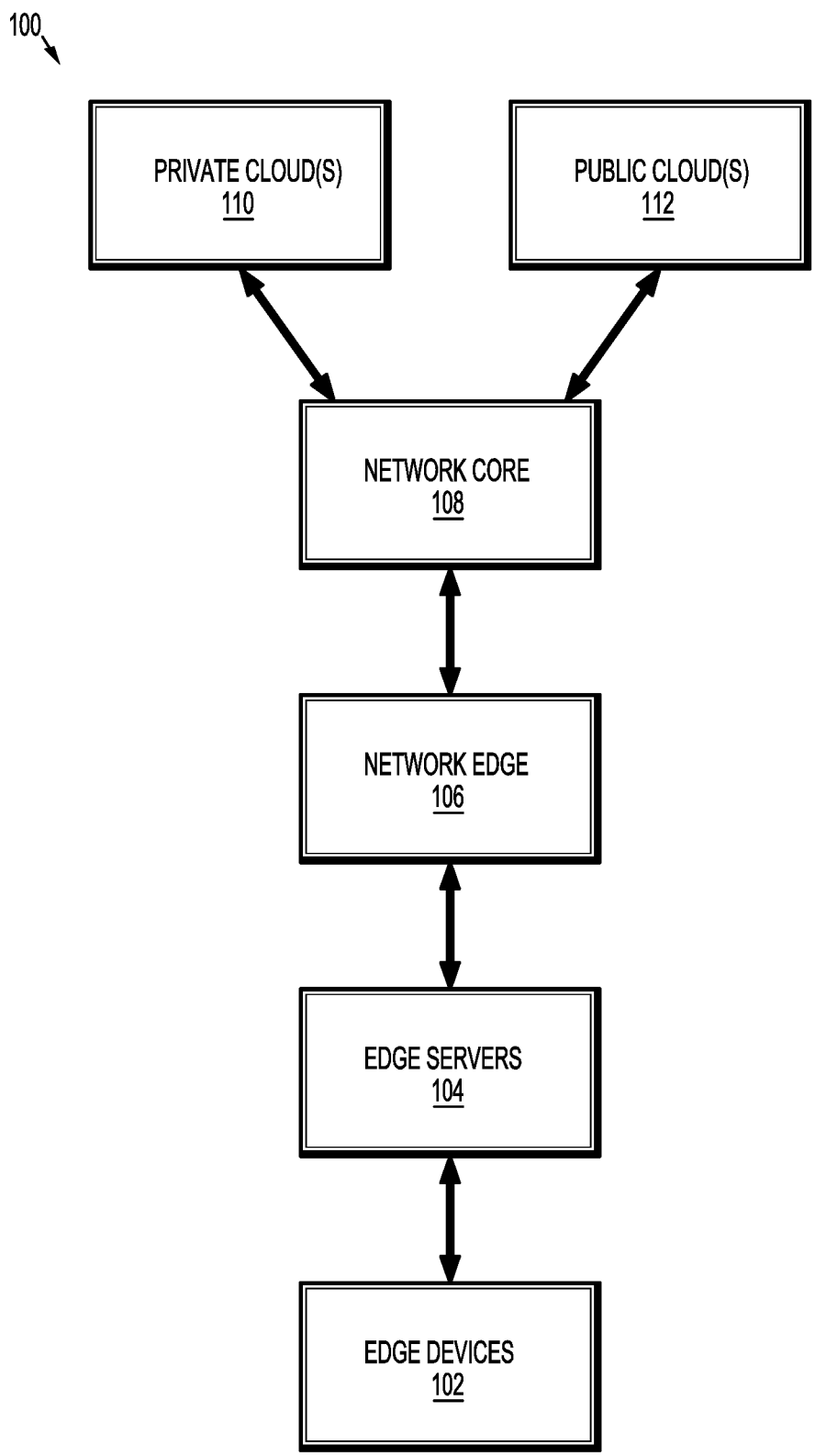
FIG. 1 illustrates a distributed computing environment in which one or more illustrative embodiments can be implemented.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass a wide variety of processing systems, by way of example only, processing systems including cloud, core and edge computing and storage systems as well as other types of processing systems including various combinations of physical and/or virtual processing resources. A distributed computing environment may be considered an example of an information processing system.

A distributed computing environment is becoming the predominant computing paradigm implemented by many entities including, but not limited to, enterprises and other entities with many users of computing devices that are geographically or otherwise dispersed. In the evolving landscape of distributed computing environments, extending beyond centralized clouds to implement multi-cloud and edge deployments, observability or monitoring of the distributed computing environment can present significant challenges.

Software processes (more generally, processes) associated with entities such as, but not limited to, enterprises, are increasingly moving towards edge computing structures for improved performance, higher bandwidth and lower latency. Examples of such processes include, but are not limited to, applications, microservices, and network partitioned processes (e.g., processes served by network slices in telecommunication provider (telco) networks, e.g., 5G networks). These processes require service level objective assurance.

However, the desire for fine-grained monitoring of such processes and the monitoring of underlying virtual and physical resources leads to increased overhead costs.

Resource availability and costs vary widely across cloud, core, and edge cluster environments. It is to be appreciated that the term cluster (or computing cluster) as illustratively used herein refers to a set of one or more computing nodes. By way of example only, in a distributed computing environment in which processes are executed in virtual processing elements known as containers, a container orchestration platform such as Kubernetes® can be used to manage execution of the processes. In a platform such as Kubernetes®, containers are instantiated and processes are executed via the containers on nodes. Thus, in some embodiments, a set of one or more nodes that execute one or more processes via one or more containers is considered a cluster, and a distributed computing environment can include one or more clusters (computing clusters). However, in such a distributed computing environment, it is preferable to expend less resources on collecting metrics from edge devices and computing systems toward the edge. This presents technical challenges for operations management. Metrics can include, without limitation, any data or measure that is indicative of one or more characteristics or attributes associated with the execution of a process.

In some use cases, for example, applications are partitioned into microservices, with microservices being flexibly and dynamically deployed across core and edge clusters. Therefore, metric collection is spread across multiple clusters. As some microservices are moved toward the edge, there is a need to adapt a metric collection frequency to adjust to both the requirement of balancing service level objective assurance needs with resource availability and the overhead cost of monitoring. There are additional network costs incurred when correlating metrics across clusters.

Therefore, it is realized herein that there is a need for dynamically adjusting the metric collection frequency and overhead costs based on challenges in application deployment, service level objective requirements, cluster resource availability, and monitoring resource overhead budget.

As an example, in 5G technology as mentioned above, network slices offer a mechanism for telecommunications providers to support multiple fully isolated virtual networks over the same physical network, supporting different service level agreement requirements. Network slices may share underlying network functions (NFs). For example, network slices may share a control plane and additionally have isolated data planes. Network slices span multiple clusters across radio access networks (RAN), transport networks, and core networks. Network slices may be modified dynamically to accept new applications. Therefore, to provide network slice assurance, it is important to adapt to changes in applications served by the slice, the changing service level agreements of the applications, the modifications to the slice topology with NFs moved across clusters, and the resource availability in those clusters.

As another example, in multi-cluster multi-cloud networking, traffic flows from different applications to traverse through multiple edge, core, and transit gateways. These traffic flows are highly dynamic as new applications are deployed and connections are established. The traffic flows may be re-routed through alternate pathways traversing through other gateways. Different traffic flows have different service level objective requirements in terms of performance and cost. Gateways toward the edge preferably have lower overhead costs compared to core and transit gateways. Monitoring the various traffic flows requires adapting to the service level objectives of the flows, the specific gateways through the flow, the number of flows served by each gateway, and the resource availability and budget at each gateway.

Edge computing provides services at the telecommunication provider edge, enabling mobile and cell phone applications to have faster response times. Additionally, edge computing uses the computing capacity of small devices in the field. There are also many other edge applications beyond those examples, and edge computing is forecast to grow exponentially in the near future.

Conventional static metric monitoring approaches face technical challenges, e.g., dealing with inefficient data transfer, limited scalability across heterogenous environments, and rigid data processing pipelines. In distributed applications, observability, or the collection and processing of telemetry data, is vital to ensuring the monitoring and smooth functioning of the entire system. Observability data from such diverse sources should be aggregated to provide a unified view of the system to the operator to enable timely detection of problem root causes. Further, the distributed aspect of these systems means the underlying problems may compound to impact the overall system in unexpected ways-which necessitates the use of advanced machine learning techniques to quickly identify root causes in large and complex deployments.

Extending observability from the single cloud to multi-cloud environments is also a technical challenge. Existing solutions fare poorly for the multi-cloud environment in two ways. First, existing approaches are usually bottom-up, where collection rates of individual metrics are decided based on the local history of the metric. These local approaches fail to take into account a global view of the bandwidth available at a location of the importance of the metric towards downstream tasks in relation to all other metrics. Second, these approaches are not dynamic in the face of changing underlying conditions. Multi-cloud environments, more so than single-cloud environments, are characterized by dynamically changing conditions such as traffic conditions at individual clouds changing with time, and work-load deployments changing due to cloud-bursts leading to different amounts of available bandwidth.

As discussed in further detail herein, illustrative embodiments provide systems and computerized methods dynamically adjusting the metric collection frequency and overhead resource allocation budget based on changes in application deployment, service level objective requirements, cluster resource availability, and monitoring resource overhead budget. In at least some embodiments, metric management in multi-cluster computing environment can incorporate dynamic adjusting of the metric collection frequency, collection cost, monitoring cost, and metric importance analysis to avoid costly collection of data that is not important to the overall multi-cluster computing environment. It is to be understood that the terms "importance" or "important" as illustratively used herein in the context of a given metric are terms relative to the particular distributed computing environments and processes with which techniques described herein are implemented. In at least some embodiments, systems and computerized methods advantageously improve efficiency while avoiding collection error in metric management in multi-cluster computing environment.

Referring initially to FIG. 1, a distributed computing environment 100 is depicted in which one or more illustrative embodiments can be implemented. For example, distributed computing environment 100 distributes and manages workloads across multiple computing nodes that reside among edge devices 102, edge servers 104, a network edge 106, a network core 108, one or more private clouds 110, and one or more public clouds 112. In some embodiments, one management principle is to place workloads as close as possible to edge devices 102 where data is being created and acted upon. The purpose of an edge computing environment is to produce faster response times, greater data privacy, and reduced data transfer costs for users.

Each of edge devices 102 is typically built for a particular purpose, or is installed in a particular context such that it serves some specific purpose. Edge devices 102 may be extremely diverse in hardware architecture, power consumption, compute capacity, memory, storage, networking ability, attached peripherals, and more. Edge devices 102 are deployed in environments at a local level and communicate with edge server 104 utilizing local area networks (LANs) designed to communicate data between devices located in a local area, such as a Wi-Fi network. In some cases, basic services, such as network connections or even power supplies, might be intermittent or otherwise unreliable.

Edge servers 104 may include data center-class machines. In some embodiments, a workload that is destined for any one of edge servers 104 can be placed on any other edge server 104 as edge servers 104 provide generic computing services. Edge servers 104 can be deployed in clusters that run Kubernetes®, as mentioned above, thereby enabling cloud-native features such as autonomous workload monitoring, automatic scaling up and down to manage load, and automatic workload migration on failures. Often, edge computing architectures consist of edge devices 102 that aggregate to edge servers 104, which might be deployed at network edge 106 and further aggregated to network core 108. In turn, those edge servers 104 often aggregate to more centralized hybrid cloud environments (i.e., private cloud(s) 110 and/or public cloud(s) 112). These architectures enable intelligent analysis at very low latency right where the data is created, but they also enable central aggregation, control, and management.

While internet of things (IoT) devices typically sends unfiltered data to the cloud, edge devices 102 enable local processing of the data. Edge devices 102 allow data sampling at higher resolutions and at greater sampling frequencies. After local analysis, edge devices 102 send data that eventually gets to private cloud(s) 110 and/or public cloud(s) 112, as a smaller volume of higher value data. The edge servers 104, network edge 106, and network core 108 can then concentrate on aggregation of data over large numbers of edge devices 102, covering larger areas, and for longer periods, which allows easier observation of important trends. Performing analytics locally at the edge devices 102 also produces low stimulus-response times. When multiple devices are attached to the same edge device, or to edge servers that are near to each other in the network, response times may be within milliseconds, or less than a millisecond in some cases. Therefore, local edge device to edge device communication is significantly faster than a typical round-trip time for communications with any remote cloud server. The low latencies also allow faster reactions to the necessary decisions and activities.

Figure 2:
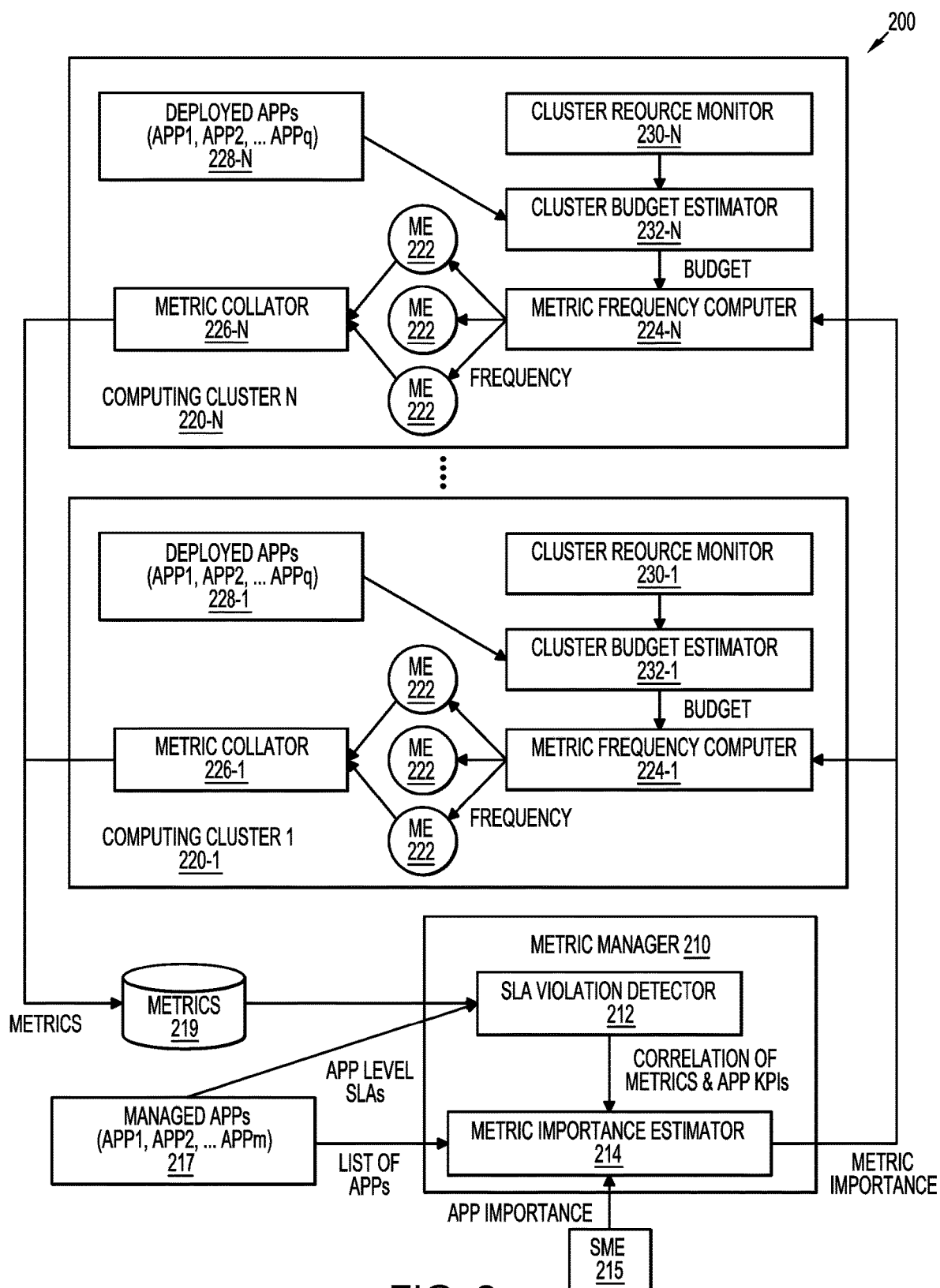
FIG. 2 illustrates a multi-computing cluster environment with metric management including adaptive metric collection functionalities according to an illustrative embodiment.

Turning now to FIG. 2, a multi-computing cluster environment 200 configured in accordance with an illustrative embodiment is shown. The multi-computing cluster environment 200 includes metric manager 210 and computing clusters 220-1, . . . 220-N (collectively computing clusters 220 or individually computing cluster 220). The computing clusters 220 communicate over one or more networks with metric manager 210. The computing clusters 220 can include, for example, any one or more of private cloud(s) 110, public cloud(s) 112, network cores 108, network edges 106, edge servers 104, and edge devices 102 of distributed computing environment 100. In one non-limiting example, a first computing cluster 220 can refer to edge devices 102, a second computing cluster 220 can refer to edge servers 104, a third computing cluster 220 can refer to network edge 106, a fourth computing cluster 220 can refer to network core 108, a fifth computing cluster can refer to private cloud(s) 110, a sixth computing cluster 220 can refer to public cloud(s) 112, or any combination thereof (e.g., a computing cluster 220 can refer to nodes from two or more of edge devices 102, edge servers 104, network edge 106, network core 108, private cloud(s) 110, and public cloud(s) 112).

The multi-computing cluster environment 200 further includes managed applications (APPs) 217 including, for instance, APP1, APP2, . . . APPm (collectively managed applications 217 or individually managed applications 217) and metrics 219. The metrics 219 are collected from computing clusters 220. In computing clusters 220, for example, a variety of deployed applications 228-1 . . . 228-N including, for instance, APP1, APP2, . . . APPq (collectively deployed applications 228 or individually deployed application 228) are separated into microservices (not expressly shown), with microservices being flexibly and dynamically deployed across various computing clusters 220. It is to be appreciated that the deployed applications 228-1 . . . 228-N collectively include the managed applications 217.

Along with the deployed applications 228, computing clusters 220 further include cluster resource monitors 230-1, . . . 230-N (collectively cluster resource monitors 230 or individually cluster resource monitor 230). The cluster resource monitors 230 determine a current resource availability of the computing cluster and one or more monitoring limits of the computing cluster. The current resource availability of the computing cluster is determined by monitoring real-time cluster resource utilization and a number of the one or more processes (deployed applications 228) that are executable on the computing clusters 220.

The computing clusters 220 further include cluster budget estimators 232-1, . . . 232-N (collectively cluster budget estimators 232 or individually cluster budget estimator 232) which determine a resource allocation for a computing cluster of the one or more computing clusters 220 based on at least one of the current resource availability of the computing cluster, determined by the cluster resource monitor 230, and one or more monitoring limits of the computing cluster, an output of deployed applications 228. A per-cluster monitoring resource overhead budget is a resource allocation for a computing cluster of the one or more computing clusters 220 which is estimated to include per-endpoint (such as per-node) resource limits and total cluster resource limits. An application-level budget may be specified as well, e.g., an application with more stringent service level agreements (SLAs) will be allocated a higher budget and more resources than an application with less stringent SLAs. An application-level budget may further be divided into per-cluster application-level budgets depending on the number or importance of components (microservices) of the application on each cluster. This budget estimation process is executed periodically at each computing cluster 220 and is performed by cluster budget estimators 232 to ensure that, if very few deployed applications 228 (processes) are deployed on the computing cluster 220, an inordinate amount of resources is not wasted on monitoring. Just because the resources are available does not mean they need to be allocated to or used by a low-traffic computing cluster.

The metric manager 210 includes, for example, a service level agreement (SLA) violation detector 212, which performs a service level violation analysis. The service level violation analysis determines when one or more service level criteria associated with one or more processes (managed applications 217 or network slices) has been violated. The SLA violation detector 212 processes input metrics 219 from computing clusters 220 and application-level SLAs from managed applications 217 to analyze the set of metrics 219 collected from the computing clusters 220 for violations of an SLA of the managed applications 217.

When the SLA violation detector 212 performs the processing with application-specific logic, e.g., when the SLA violation detector 212 is an opaque system with unknown weights, the SLA violation detector 212 then outputs a set of metrics that do not violate an SLA of the managed applications 217 and correlates the set of metrics to application key performance indicators (KPIs) for the managed applications 217. The correlation of the set of metrics to the application KPIs is input into a metric importance estimator 214.

Alternatively, when the SLA violation detector 212 performs the processing with a machine learning algorithm, such as a supervised or semi-supervised machine learning algorithm, the machine learning algorithm is trained on fault detection data. The SLA violation detector 212 then outputs a set of metrics that do not violate an SLA of the managed applications 217 and assigns a set of respective weights for the list of applications to the set of metrics. Alternatively, a binary value may be assigned to one or more metrics of the set of metrics. Alternatively, a predetermined set of weights may be assigned to the set of metrics based on domain knowledge from a subject matter expert (SME) 215. The output of the SLA violation detector 212 is input into the metric importance estimator 214.

The metric importance estimator 214 computes one or more metric importance values for the set of metrics 219 based on one or more processing criteria. The one or more processing criteria may include a service level violation analysis performed by SLA violation detector 212. The one or more metric importance values may further be based on domain knowledge from the subject matter expert (SME) 215, respective weights for the list of applications, and/or correlation of the set of metrics to the application KPIs. The one or more metric importance values represent per-endpoint (per-node) per-metric importance to SLA detection using the SLA requirements of the managed applications 217. The metric importance estimator 214 computes one or more metric importance values at the metric manager 210 whenever KPIs of the managed applications 217 or metric importance values change (e.g., a new application is added, an application is deleted, traffic flow changes). The one or more metric importance values are then output and sent to at least one computing cluster of the one or more computing clusters to enable the at least one computing cluster to adapt a collection frequency of at least one metric of the set of metrics.

The computing clusters 220 further include metric frequency computers 224-1, . . . 224-N (collectively metric frequency computers 224 or individually metric frequency computer 224) which obtain the one or more metric importance values from the metric importance estimator 214 of the metric manager 210 and further obtain the resource allocation (budget) for the computing cluster from the cluster budget estimator 232. The metric frequency computers 224 compute a collection frequency of at least one metric of the set of metrics and may further adapt the collection frequency of the at least one metric of the set of metrics based on changes in the one or more metric importance values for the set of metrics and changes to the resource allocation (budget) for the computing cluster. The collection frequency of at least one metric of the set of metrics advantageously maximizes or otherwise accounts for a total frequency of obtaining a set of important metrics collected from the one or more computing clusters of the distributed computing environment. The set of important metrics is deemed important by the one or more metric importance values based on the output of the metric importance estimator. The collection frequency of at least one metric of the set of metrics may be proportional to the one or more metric importance values for the set of metrics.

The collection frequency implemented by the metric frequency computers 224 adapts the collection of metrics associated with one or more processes (deployed applications 228) that are executable on the one or more computing clusters 220. The metric data is collected from metric endpoints (MEs) 222 and aggregated to metric collators 226-1, . . . 226-N(collectively metric collators 226 or individually metric collator 226) in the computing clusters 220 to be collected as the set of metrics 219. The set of metrics 219 is then sent to SLA violation detector 212 to repeat the monitoring and adapting processes for each computing cluster 220 in connection with the metric manager 210.

Figure 3:
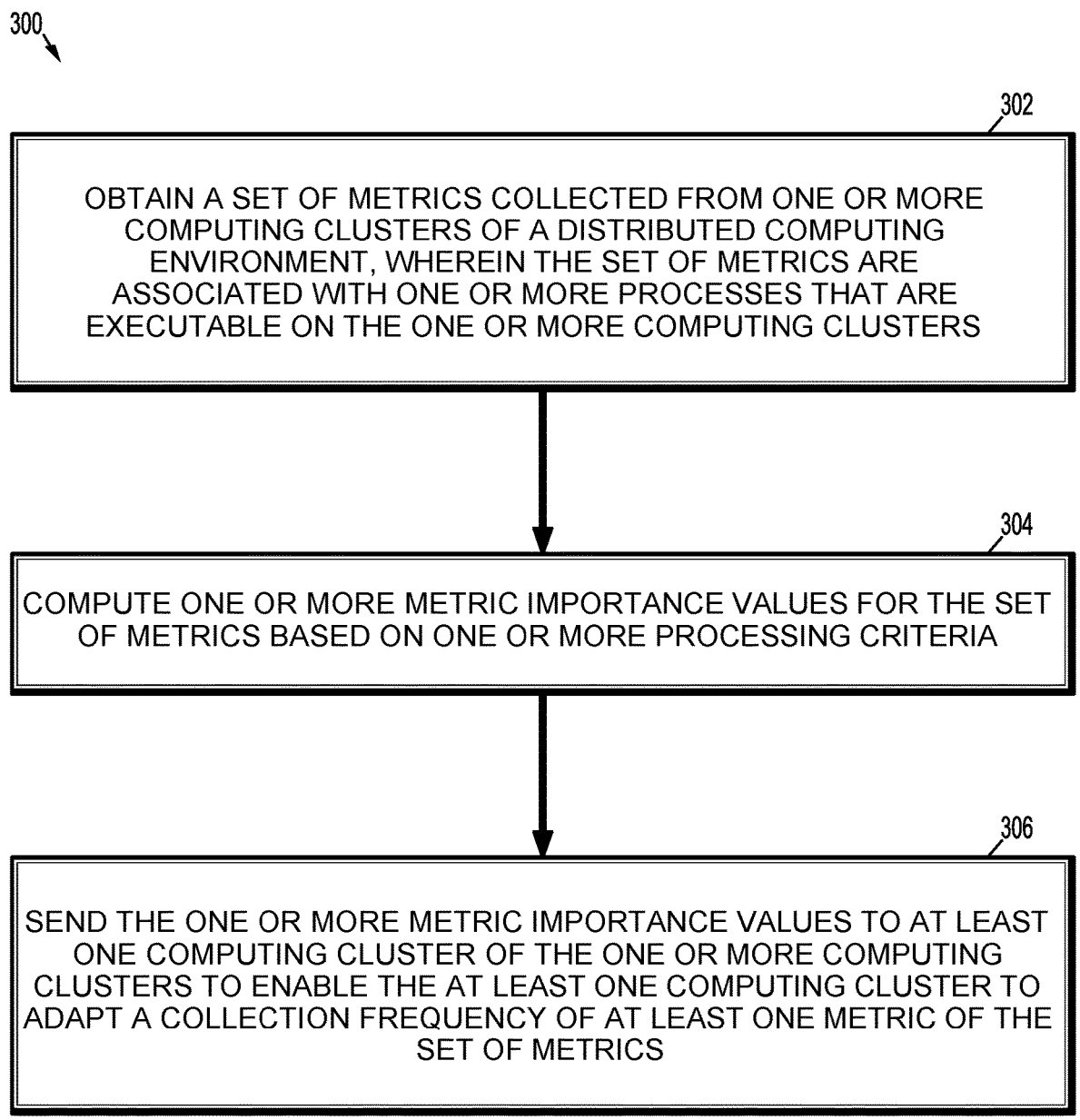
FIG. 3 illustrates a methodology for metric management with adaptive metric collection according to an illustrative embodiment.

FIG. 3 depicts an operational flow 300 in connection with computing one or more metric importance values for the set of metrics at a metric manager according to an illustrative embodiment. For example, when there are changes in application, process, and/or network slice deployment, including changes in service level objective requirements, cluster resource availability, and/or monitoring overhead budget or costs, the metrics collected may vary in importance to the application, process, and/or network slice deployment across the clusters.

As shown, step 302 obtains a set of metrics collected from one or more computing clusters of a distributed computing environment, wherein the set of metrics are associated with one or more processes that are executable on the one or more computing clusters. For example, the metric manager 210 obtains a set of metrics 219 at SLA violation detector 212 collected from a metric collator 226 of one or more computing clusters 220 of a distributed computing environment (i.e., multi-computing cluster environment 200). The set of metrics 219 are associated with one or more processes (e.g., deployed applications 228, managed applications 217) that are executable on the one or more computing clusters 220.

Step 304 computes one or more metric importance values for the set of metrics based on processing criteria, which may include a service level violation analysis. For example, metric importance estimator 214 computes one or more metric importance values for the set of metrics 219 based on one or more processing criteria, the one or more processing criteria including a service level violation analysis conducted by SLA violation detector 212.

Step 306 sends the one or more metric importance values to at least one computing cluster of the one or more computing clusters to enable the at least one computing cluster to adapt a collection frequency of at least one metric of the set of metrics. For example, the one or more metric importance values are sent to at least one computing cluster of the one or more computing clusters 220 to enable the at least one computing cluster to adapt a collection frequency of at least one metric of the set of metrics 219 with the metric frequency computer 224.

Figure 4:
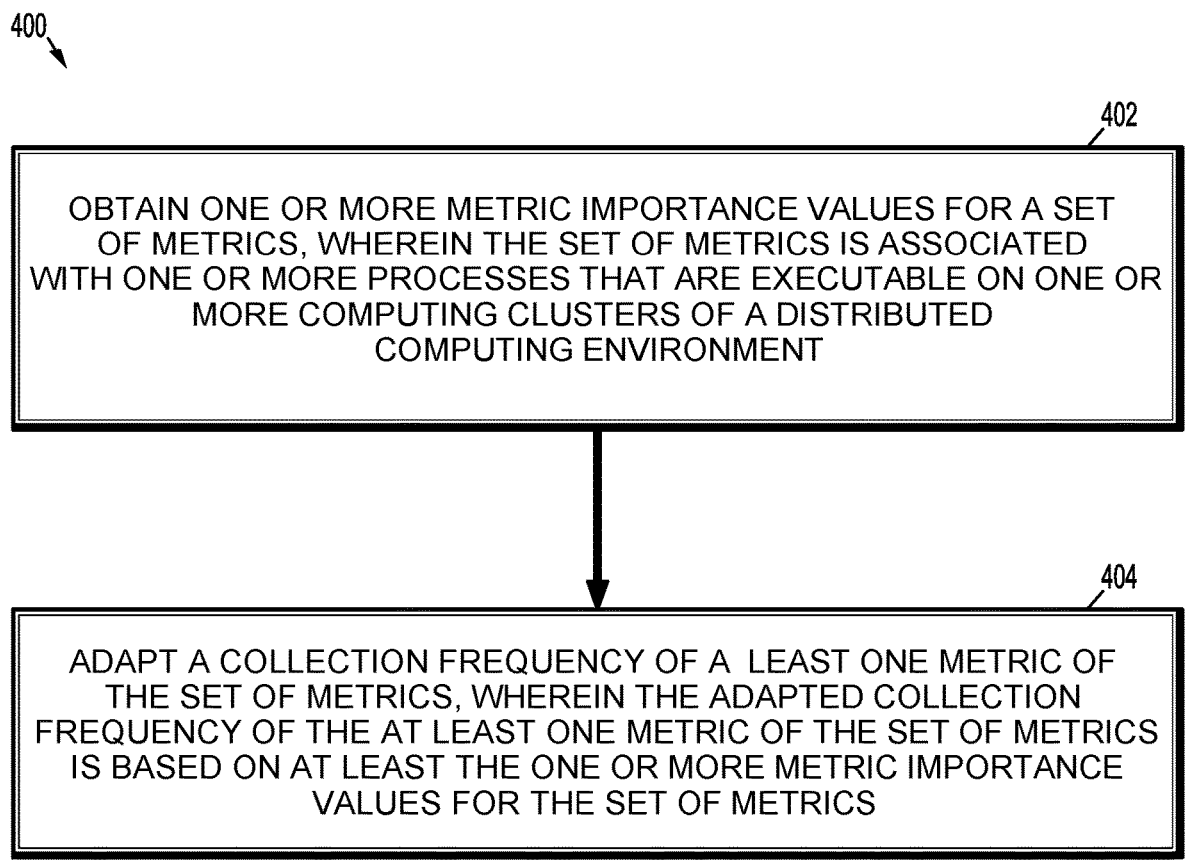
FIG. 4 illustrates another methodology for metric management with adaptive metric collection according to an illustrative embodiment.

FIG. 4 depicts an operational flow 400 in connection with changing a metric collection frequency according to an illustrative embodiment. For example, when there are changes in application, process, and/or network slice deployment, including changes in service level objective requirements, service level agreement requirements, cluster resource availability, and/or monitoring overhead budget or costs, the metric collection frequency is dynamically adjusted to account for the changes and control costs toward the edge of a multi-computing cluster environment 200.

As shown, step 402 obtains one or more metric importance values for a set of metrics, wherein the set of metrics are associated with one or more processes that are executable on one or more computing clusters of a distributed computing environment. For example, the metric frequency computer 224 obtains one or more metric importance values for a set of metrics 219 from the metric importance estimator 214 of the metric manager 210. The set of metrics is associated with one or more processes (e.g., deployed applications 228, managed applications 217) that are executable on one or more computing clusters 220 of a distributed computing environment (i.e., multi-computing cluster environment 200).

Step 404 adapts a collection frequency of at least one metric of the set of metrics, wherein the adapted collection frequency of the at least one metric of the set of metrics is based on at least the one or more metric importance values for the set of metrics. For example, the metric frequency computer 224 adapts the collection frequency of at least one metric of the set of metrics 219. The adapted collection frequency of the at least one metric of the set of metrics 219 is based on at least the one or more metric importance values for the set of metrics 219 determined by the metric importance estimator 214 of the metric manager 210.

Referring, for example, to exemplary pseudocode 500 of FIG. 5, in connection with metric importance estimator 214, one or more metric importance values are computed whenever a process, application, and/or network slice undergoes important changes, such as a change in key performance indicators and/or a change in service level objective requirements. A time series for each key performance indicator of each managed application 217 is input at the metric importance estimator 214 of the metric manager 210. A constant for each application may also be determined by a subject matter expert (SME 215) and input at the metric importance estimator 214 of the metric manager 210. A correlation of the set of metrics and the application KPIs may also be computed offline or centrally and input at the metric importance estimator 214 of the metric manager 210. The metric importance estimator 214 then produces one or more metric importance values based on an x*y matrix where x represents all applications and y represents all metrics.

The metric importance estimator 214 then determines which metrics have higher value. Metrics that are highly correlated with application KPIs are deemed more important. Metrics that impact important applications are also deemed more important. When a new application is added to the multi-computing cluster environment 200, this metric importance estimation process needs to be executed only for the newly added application, resulting in addition of a new row in the metric importance matrix computation. When an application is deleted, its row in the metric importance matrix computation is removed.

Referring, for example, to exemplary pseudocode 600 of FIG. 6, in connection with cluster budget estimator 232, a resource allocation for a given computing cluster is determined based on at least one of a current resource availability of the computing cluster and one or more monitoring limits of the computing cluster. The resource allocation for the given computing cluster is determined periodically at each computing cluster to advantageously ensure that resources are allocated to clusters with important applications or importance metrics associated with processes, applications, and/or network slices. A resource availability is input at the cluster budget estimator 232 from the cluster resource monitor 230 in relation to a time series of percentage resource availability for each resource required for monitoring (e.g., CPU, memory, bandwidth) collected by the cluster resource monitor. Additionally, a default budget, maximum budget, and/or minimum budget may be input at the cluster budget estimator 232. The default budget, maximum budget, and/or minimum budget may be determined by a subject matter expert (SME 215). A default budget can be the same as the resource allocation in existing systems without an adaptive metrics collection system in place. Additionally, a default resource availability may be input at the cluster budget estimator 232. The default resource availability may also be provided by a subject matter expert (SME 215) or determined based on historical data.

The cluster budget estimator 232 then determines a resource allocation (e.g., a cluster budget) for the computing cluster. If the computing cluster has not used an adaptive metrics collection system yet, the resource allocation is initialized to the default budget value. The resource allocation is defined by a function that takes into account resource availability, default resource availability, and budget change with any aggregate function (e.g., weighted average with different weights for each resource). The budget change may be an increase or decrease of availability and therefore an increase or decrease in resource allocation. The resource allocation may also be determined by a function of both resource availability and application components deployed on the cluster (e.g., number, importance, type, traffic). This will ensure that if very few applications are deployed on the cluster, it does waste an inordinate number of resources on monitoring just because resources are available.

Referring, for example, to exemplary pseudocode 700 of FIG. 7 according to an illustrative embodiment, in connection with metric frequency computer 224, a collection frequency of at least one metric of the set of metrics is adapted to account for a total frequency of obtaining a set of important metrics collected from the one or more computing clusters of the distributed computing environment. The adaptation of the collection frequency for each computing cluster may be executed periodically to ensure optimal (or otherwise improved) collection of important metrics while saving on overhead costs. The metric frequency computer 224 may utilize a machine learning model, optimization solver, or may utilize numerical methods or heuristics. The one or more metric importance values, determined by the metric importance estimator 214, may be input at the metric frequency computer 224. Metrics that contribute to more processes and/or applications are deemed more important and have a higher metric importance value. An overall computing cluster metric importance is computed based on a sum or aggregation function for the metric importance value of all the metrics for the applications deployed on the computing cluster. The resource allocation, determined by the cluster budget estimator 232, may be input at the metric frequency computer 224. The resource allocation may be per application deployed in the computing cluster or can be separated into an allocation per resource available to the computing cluster. A metric cost, determined by the cluster budget estimator 232, may be input at the metric frequency computer 224. The metric cost is a cost of the metric collection and/or transmission from the metric endpoints 222 to the metric collator 226 to aggregate the metrics into a set of metrics 219. A reward function may also be input at the metric frequency computer 224. The reward function may be any function (e.g., convex with respect to the metric collection frequency produced and/or a step function).

The metric frequency computer 224 then determines a collection frequency for the computing cluster. The collection frequency of at least one metric of the set of metrics may be proportional to the one or more metric importance values for the set of metrics. The collection frequency of at least one metric of the set of metrics 219 accounts for (e.g., maximizes) a total frequency of obtaining a set of important metrics collected from the one or more computing clusters of the distributed computing environment (multi-computing cluster environment 200).

The illustrative embodiments help achieve bandwidth saving across clusters of a multi-cluster computing environment. The illustrative embodiments help implement a global view of an entire system to calculate optimal frequency for metric collection. This adaptation facilitates making collection frequency adjustments based on the full view of the system, such as increasing monitoring resource usage in certain endpoints (with more important metrics) while other endpoints use lesser resources such that overall cost and benefit is balanced. The illustrative embodiments adapt the metric importance in case of changes in application SLAs, changes in application deployment, etc. This adaptation allows the system to support dynamism in external factors and requirements. The illustrative embodiments allow setting per-cluster and per-application a monitoring budget so that clusters with low load can have more observability and clusters with high load are not affected by high observability overheads. Moreover, within a cluster, some applications are more important and will need higher frequency of collection than other applications. The illustrative embodiments adjust the metric collection frequency with the aim of minimizing the bandwidth consumption, and maximizing the probability of detection of any event. Illustrative embodiments take into consideration the priority of the metrics as well as the events while deciding the optimal frequency. The collected metrics can then be used for performing any downstream analytics task. The illustrative embodiments are particularly useful in an edge-cloud setting which is highly resource constrained and is typically required to meet stringent SLA requirements.

The illustrative embodiments offer a holistic system-wide perspective for calculating the optimal data metric collection frequency, a departure from prior approaches that adopt a more localized view. This holistic system-wide perspective enables the making of informed decisions across the entire system, dynamically allocating monitoring resources to endpoints based on metric importance. The illustrative embodiments facilitate adaptation according to changes in application SLAs and deployment, accommodating external dynamics and requirements seamlessly. The illustrative embodiments introduce the flexibility of setting monitoring budgets per-cluster and per-application. This setting ensures that resource-constrained clusters can maintain observability without undue overhead, while high-priority applications receive the necessary attention. Metric collection frequency is optimized to minimize bandwidth usage while maximizing event detection, considering metric priority and event significance. This innovation is particularly valuable in resource-constrained edge-cloud environments striving to meet stringent SLA requirements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the inventive methods, adaptive metric collection code 826 (also referred to as "block 826"). In addition to block 826, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 826, as identified above), peripheral device set 814 (including user interface (UI) devices set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Figure 8:
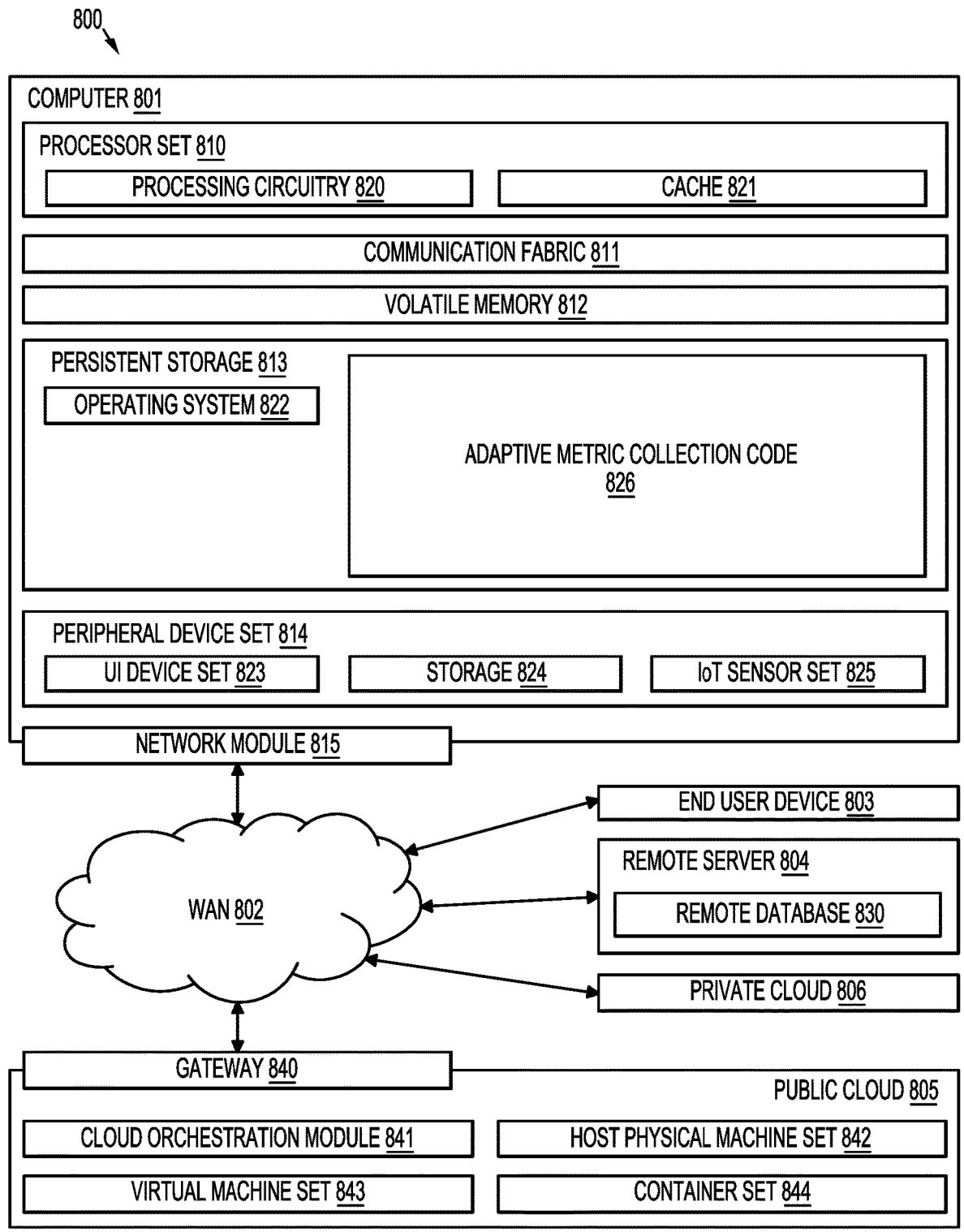
FIG. 8 illustrates another distributed computing environment in which one or more illustrative embodiments can be implemented.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

Processor set 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer-readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 826 in persistent storage 813.

Communication fabric 811 is the signal conduction path that allows the various components of computer 801 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

Persistent storage 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid-state storage devices. Operating system 822 may take several forms, such as various known proprietary operating systems or open-source Portable Operating System Interface-type operating systems that employ a kernel. The code included in block 826 typically includes at least some of the computer code involved in performing the inventive methods.

Peripheral device set 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

Network module 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer-readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

Remote server 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

Public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Cloud computing services and/or microservices (not separately shown in FIG. 8): private and public clouds 805 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application program interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    obtaining a set of metrics collected from one or more computing clusters of a distributed computing environment, wherein the set of metrics are associated with one or more processes that are executable on the one or more computing clusters;
    computing one or more metric importance values for the set of metrics based on one or more processing criteria; and
    sending the one or more metric importance values to at least one computing cluster of the one or more computing clusters to enable the at least one computing cluster to adapt a collection frequency of at least one metric of the set of metrics;
    wherein the collection frequency of the at least one metric of the set of metrics accounts for a total frequency of obtaining a set of important metrics collected from the one or more computing clusters of the distributed computing environment, and is proportional to the one or more metric importance values for the set of metrics; and
    wherein the computer-implemented method is performed by a processing platform when executing program code, the processing platform comprising one or more processing devices, each of the one or more processing devices comprising a processor coupled to a memory.

2. The computer-implemented method of claim 1, wherein the one or more processes comprise at least one of one or more applications, one or more microservices, and one or more network slices.

3. The computer-implemented method of claim 1, further comprising computing one or more metric importance values for the set of metrics based on a violation of the one or more processing criteria.

4. The computer-implemented method of claim 3, wherein the computing is performed with application-specific logic.

5. The computer-implemented method of claim 1, wherein computing the one or more metric importance values for the set of metrics is further based on correlating the set of metrics to a corresponding set of key performance indicators of the one or more processes following an analysis of the one or more processing criteria.

6. The computer-implemented method of claim 3, wherein the computing is performed by a machine learning algorithm.

7. The computer-implemented method of claim 6, wherein the machine learning algorithm is a supervised or a semi-supervised algorithm and wherein the machine learning algorithm is trained on fault detection data.

8. The computer-implemented method of claim 1, wherein computing the one or more metric importance values for the set of metrics is further based on a set of respective weights assigned to the set of metrics.

9. The computer-implemented method of claim 1, wherein computing the one or more metric importance values for the set of metrics is further based on a binary value assigned to one or more metrics of the set of metrics.

10. The computer-implemented method of claim 1, wherein computing the one or more metric importance values for the set of metrics is further based on a set of weights assigned to the set of metrics based on domain knowledge.

11. The computer-implemented method of claim 1, further comprising determining a resource allocation for a computing cluster of the one or more computing clusters based on at least one of a current resource availability of the computing cluster and one or more monitoring limits of the computing cluster; and
    wherein the current resource availability of the computing cluster is determined by monitoring real-time cluster resource utilization and a number of the one or more processes that are executable on the one or more computing clusters.

12. The computer-implemented method of claim 11, wherein the collection frequency of at least one metric of the set of metrics is based on at least one of the resource allocation for the computing cluster and the one or more metric importance values for the set of metrics, and wherein the collection frequency of at least one metric of the set of metrics is determined by a machine learning model.

13. An apparatus comprising:
    a processing platform comprising a processor set, a set of one or more computer-readable storage media, and program instructions, collectively stored in the set of one or more storage media, for causing the processor to perform computer operations comprising:
    obtaining a set of metrics collected from one or more computing clusters of a distributed computing environment, wherein the set of metrics are associated with one or more processes that are executable on the one or more computing clusters;
    computing one or more metric importance values for the set of metrics based on one or more processing criteria; and
    sending the one or more metric importance values to at least one computing cluster of the one or more computing clusters to enable the at least one computing cluster to adapt a collection frequency of at least one metric of the set of metrics;
    wherein the collection frequency of the at least one metric of the set of metrics accounts for a total frequency of obtaining a set of important metrics collected from the one or more computing clusters of the distributed computing environment, and is proportional to the one or more metric importance values for the set of metrics.

14. The apparatus of claim 13, wherein the collection frequency of at least one metric of the set of metrics is based on at least one of a resource allocation for a given computing cluster and the one or more metric importance values for the set of metrics.

15. A computer program product comprising a computer readable storage medium having program instructions embodied therewith, wherein the program instructions are executable by a processing platform comprising one or more processing devices, each of the one or more processing device comprising a processor coupled to a memory, to cause the processors of the one or more processing devices to:
   obtain one or more metric importance values for a set of metrics, wherein the set of metrics is associated with one or more processes that are executable on one or more computing clusters of a distributed computing environment; and
   adapt a collection frequency of at least one metric of the set of metrics;
   wherein the adapted collection frequency of the at least one metric of the set of metrics is based on at least the one or more metric importance values for the set of metrics; and
   wherein the adapted collection frequency of the at least one metric of the set of metrics accounts for a total frequency of obtaining a set of important metrics collected from the one or more computing clusters of the distributed computing environment, and is proportional to the one or more metric importance values for the set of metrics.

16. The computer program product of claim 15, wherein the program instructions executable by the processing platform further cause the processors of the one or more processing devices to determine a resource allocation for a given computing cluster based on at least one of a current resource availability of the given computing cluster and one or more monitoring limits of the given computing cluster.

17. The apparatus of claim 13, wherein the one or more processes comprise at least one of one or more applications, one or more microservices, and one or more network slices.

18. The apparatus of claim 13, wherein the collection frequency of at least one metric of the set of metrics is determined by a machine learning model.

19. The computer program product of claim 15, wherein the one or more processes comprise at least one of one or more applications, one or more microservices, and one or more network slices.

20. The computer program product of claim 16, wherein the program instructions executable by the processing platform further cause the processors of the one or more processing devices to determine the current resource availability of the computing cluster by monitoring real-time cluster resource utilization and a number of the one or more processes that are executable on the one or more computing clusters.

* * * * *